(12) United States Patent
Talimi et al.

(10) Patent No.: US 12,553,478 B2
(45) Date of Patent: *Feb. 17, 2026

(54) DECOUPLER WITH TORQUE-LIMITING FEATURE TO PROTECT COMPONENTS THEREOF

(71) Applicant: LITENS AUTOMOTIVE PARTNERSHIP, Woodbridge (CA)

(72) Inventors: Maryam Talimi, Toronto (CA); Robert Ian Boersema, King City (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/883,379

(22) Filed: Sep. 12, 2024

(65) Prior Publication Data

US 2025/0003457 A1 Jan. 2, 2025

Related U.S. Application Data

(63) Continuation of application No. 18/262,343, filed as application No. PCT/CA2022/050086 on Jan. 20, 2022, now Pat. No. 12,117,052.

(60) Provisional application No. 63/139,607, filed on Jan. 20, 2021.

(51) Int. Cl.
*F16D 41/20* (2006.01)

(52) U.S. Cl.
CPC .................. *F16D 41/206* (2013.01)

(58) Field of Classification Search
CPC ............... F16D 41/20; F16D 41/206
See application file for complete search history.

(56) References Cited

U.S. PATENT DOCUMENTS

| 7,712,592 | B2 | 5/2010 | Jansen et al. |
| 7,766,774 | B2 | 8/2010 | Antchak |
| 7,878,315 | B2 | 2/2011 | Saito |
| 9,611,903 | B2 | 4/2017 | Shimamura |
| 10,816,041 | B2 | 10/2020 | Kastner |
| 11,028,884 | B2 | 6/2021 | Serkh |

(Continued)

OTHER PUBLICATIONS

International Search Report and Written Opinion for PCT/CA2022/050086 mailed Apr. 21, 2022.

(Continued)

Primary Examiner — James J Taylor, II
(74) Attorney, Agent, or Firm — Aird & McBurney LP (57) ABSTRACT

In an aspect, a decoupler is provided and includes an input member, an output member, a one-way clutch and an isolation spring. The one-way clutch receives torque from the input member. The isolation spring is helical, having a first helical end and a second helical end, and has first and second axial ends, and radially outer and inner surfaces. The isolation spring receives torque from the clutch, and transmits torque to the output member. The isolation spring changes size radially based on torque. The input member includes a radial projection that is positioned to frictionally engage one of the radially outer and inner surfaces of the spring when the spring reaches a selected size. Frictional engagement of the radial projection with the spring generates torque transfer directly from the input member to the spring in parallel with torque transfer from the input member to the spring through the clutch.

6 Claims, 6 Drawing Sheets

(56) References Cited

U.S. PATENT DOCUMENTS

| | | |
|---|---|---|
| 11,274,739 B2 * | 3/2022 | Shimamura ......... F16H 57/0471 |
| 12,117,052 B2 * | 10/2024 | Talimi ....................... F16D 3/12 |
| 2009/0176583 A1 | 7/2009 | Dell et al. |
| 2013/0237351 A1 | 9/2013 | Marion |
| 2020/0166084 A1 | 5/2020 | Antchak |

OTHER PUBLICATIONS

International Preliminary Report on Patentability for PCT/CA2022/050086 mailed Jul. 20, 2023.
Extended European Search Report for corresponding European application No. 22741987.6 dated Apr. 1, 2025.

* cited by examiner

DECOUPLER WITH TORQUE-LIMITING FEATURE TO PROTECT COMPONENTS THEREOF

CROSS-REFERENCE TO RELATED APPLICATIONS

This application is a continuation of U.S. patent application Ser. No. 18/262,343, filed on Jul. 20, 2023, which claims the benefit of U.S. Provisional Application No. 63/139,607, filed Jan. 20, 2021, the contents of which are incorporated herein by reference in their entirety.

FIELD OF THE DISCLOSURE

This disclosure relates generally to the field of decouplers, which allow items that are operatively connected to an endless drive member (such as an engine crankshaft and input shafts for belt-drive accessories on a vehicle engine) to operate temporarily at a speed other than the speed of the endless drive member, and more particularly to carriers for decouplers, which hold both a wrap spring clutch and an isolation spring.

BACKGROUND

It is known to provide a decoupler mechanism on an accessory, such as an alternator, that is driven by a belt from the crankshaft of an engine in a vehicle. Such a decoupling mechanism, which may be referred to as a decoupler assembly or a decoupler, permits the associated accessory to operate temporarily at a speed that is different than the speed of the belt. As is known, the crankshaft undergoes cycles of accelerations and decelerations associated with the firing of the cylinders in the engine. The decoupler permits the alternator shaft to rotate at a relatively constant speed even though the crankshaft from the engine, and hence, the pulley of the decoupler, will be subjected to these same cycles of decelerations and accelerations, commonly referred to as rotary torsional vibrations, or torsionals.

A carrier has been employed in decouplers for some time, where a wrap spring clutch is used. The carrier holds an end of a wrap spring clutch and also an end of an isolation spring, helping to keep the assembly together. It has been found, however, that failures have occurred in the carrier, over time, after many cycles of torque transfer through the decoupler. It would be advantageous to provide a decoupler that has an increased resistance to failure.

Decouplers that are subjected to high torque transients can be more susceptible to failure than decouplers in other situations. An example of such a decoupler, is a decoupler on an input shaft of a supercharger. As such it would be particularly advantageous to provide a decoupler with an increased resistance to failure in applications where there are high torque transients, such as decouplers mounted on the shaft of a supercharger.

SUMMARY

In an aspect, a decoupler is provided and includes a decoupler input member, a decoupler output member, a one-way clutch and an isolation spring. The decoupler input member is rotatable relative to the decoupler output member. The decoupler input member and the decoupler output member are rotatable about an axis. The one-way clutch is positioned to receive torque from the decoupler input member. The isolation spring is a helical torsion spring, having a first helical end and a second helical end, and has a first axial end and a second axial end, and a radially outer surface and a radially inner surface. The isolation spring is positioned to receive torque from the one-way clutch, and to transmit torque to the decoupler output member at least indirectly, through the second helical end. The isolation spring changes size radially based on how much torque is being transferred through the isolation spring. The decoupler input member includes a radial projection that is positioned to frictionally engage one of the radially outer and radially inner surfaces of the isolation spring when the isolation spring reaches a selected radial size. Frictional engagement of the radial projection with the isolation spring generates torque transfer directly from the decoupler input member to the isolation spring in parallel with torque transfer from the decoupler input member to the isolation spring through the one-way clutch.

BRIEF DESCRIPTION OF THE DRAWINGS

The foregoing and other aspects of the invention will be better appreciated with reference to the attached drawings, as follows.

DETAILED DESCRIPTION OF EXAMPLE EMBODIMENTS

Figure 1:
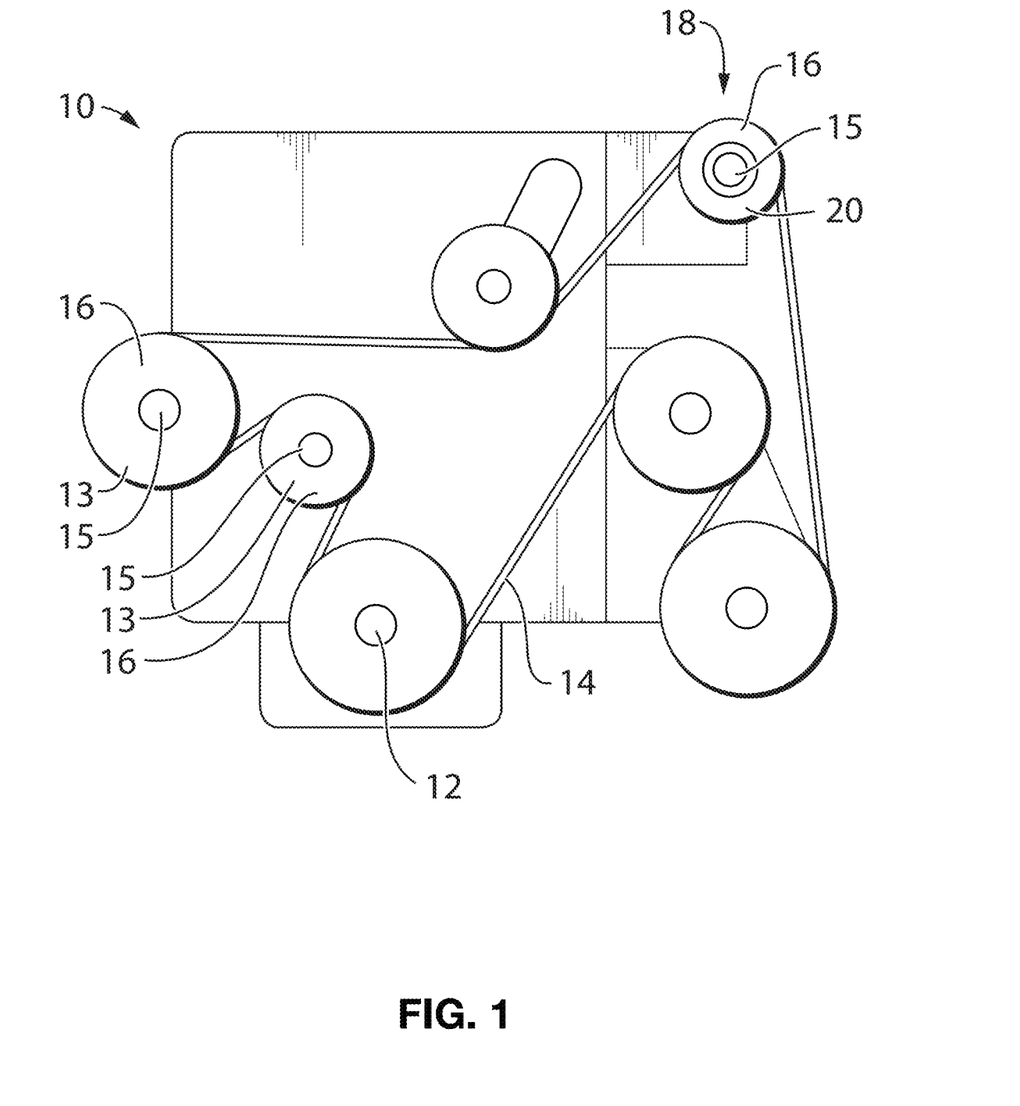
FIG. 1 is an elevation view of an engine with a belt drive with a decoupler in accordance with an embodiment of the present disclosure.

Reference is made to FIG. 1, which shows an engine 10 for a vehicle. The engine 10 includes a crankshaft 12 which drives an endless drive element, which may be, for example, a belt 14. Via the belt 14, the engine 10 drives a plurality of accessories 16, such as a supercharger 18. Each accessory 16 includes an input drive shaft 15 with a pulley 13 thereon, which is driven by the belt 14. A decoupler 20 may be provided instead of a pulley, between the belt 14 and the input shaft 15 of any one or more of the belt driven accessories 16, and in particular the supercharger 18.

Figure 2:
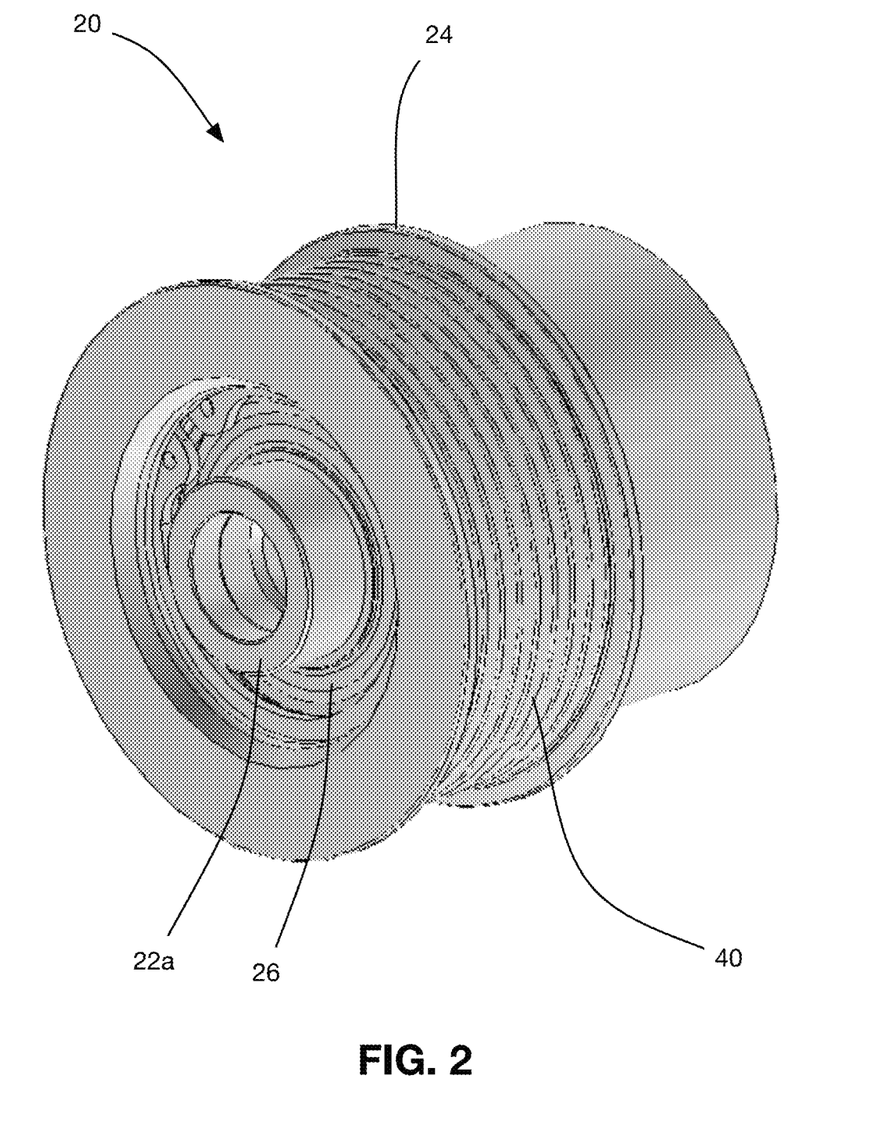
FIG. 2 is a perspective view of the decoupler shown in FIG. 1.
Figure 3A:
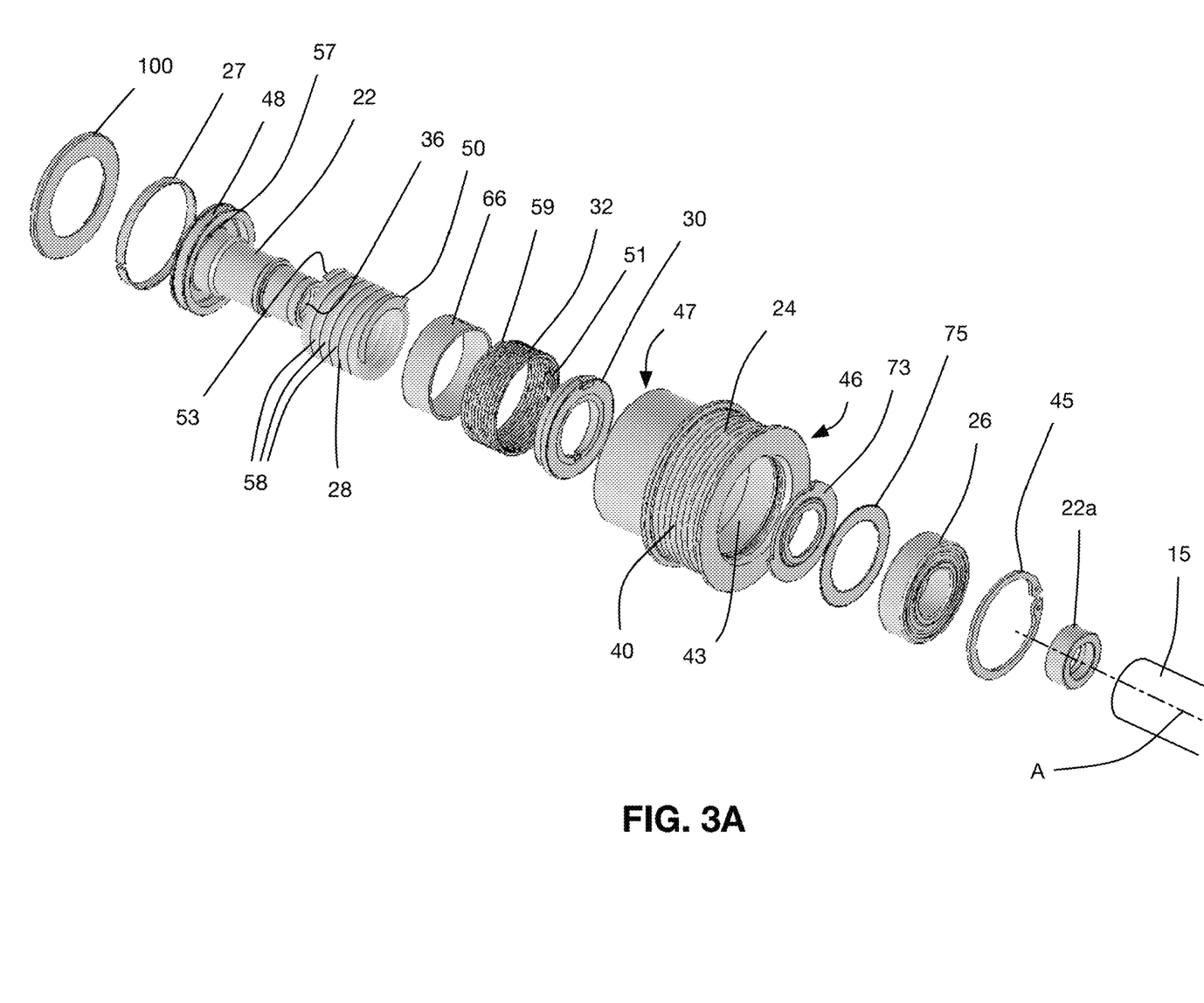
FIG. 3A is an exploded perspective view of the decoupler shown in FIG. 2.
Figure 3B:
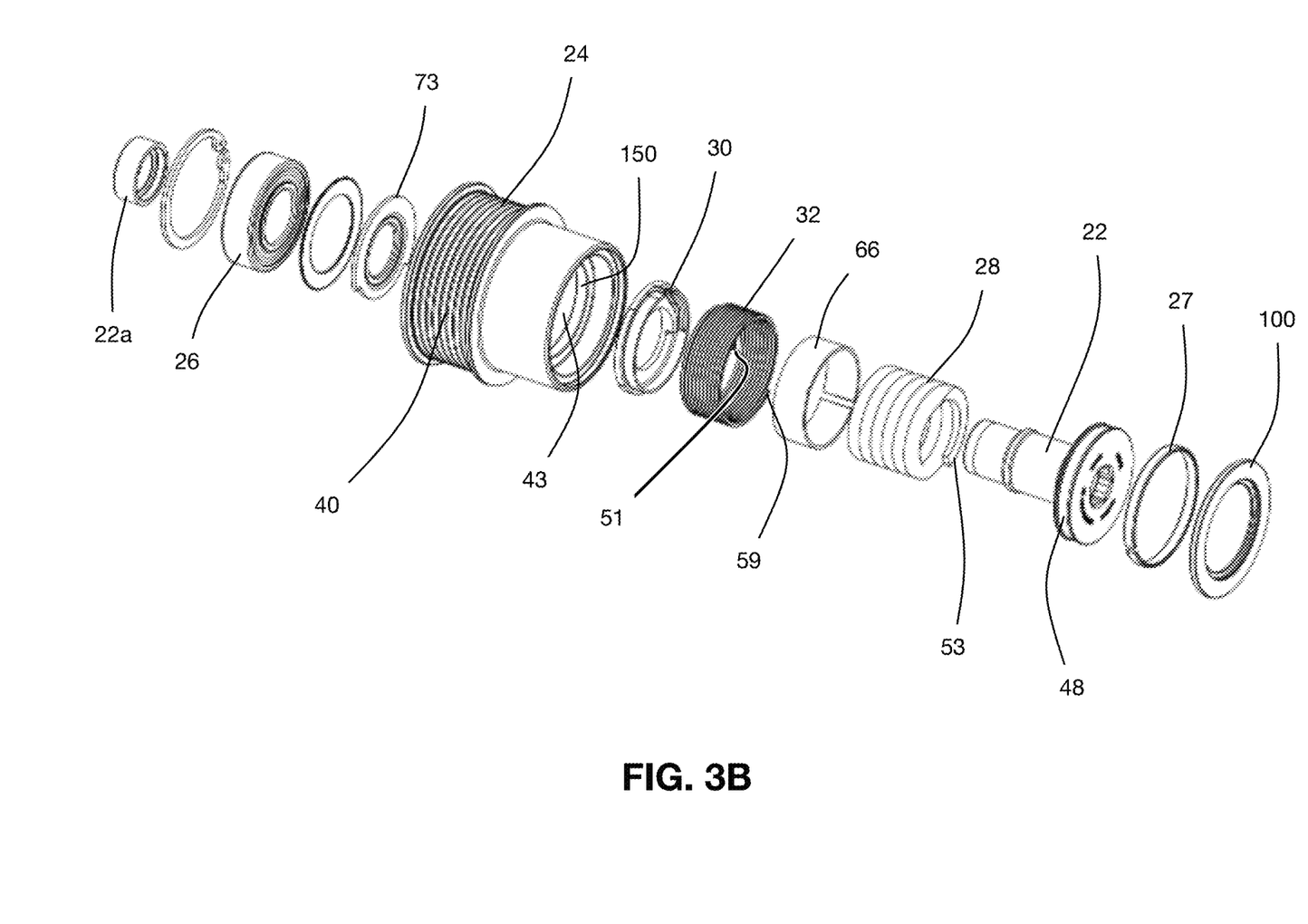
FIG. 3B is another exploded perspective view of the decoupler shown in FIG. 2.

Reference is made to FIGS. 2, 3A and 3B, which show a perspective assembled view, and two exploded perspective views respectively of the decoupler 20. The decoupler 20 includes a hub 22, a pulley 24, a first bearing member 26, a second bearing member 27, an isolation spring 28, a carrier 30, and a wrap spring clutch 32.

The hub 22 may be adapted to mount to the accessory shaft 15 (FIGS. 1 and 3A) in any suitable way. For example, the hub 22 may have a shaft-mounting aperture 36 therethrough that is used for the mounting of the hub 22 to the end of the shaft 15, for co-rotation of the hub 22 and the shaft 15 about an axis A (FIG. 3A). In the embodiment shown, the decoupler 20 includes a hub extension member 22a that acts as a spacer to position the decoupler (and the pulley 24 in particular) in a selected position axially for mating with the belt 14.

The pulley 24 is rotatably mounted to the hub 22. The pulley 24 has an outer surface 40 which is configured to engage the belt 14. The outer surface 40 is shown as having grooves 42. The belt 14 may thus be a multiple-V belt. It will be understood however, that the outer surface 40 of the pulley 24 may have any other suitable configuration and the belt 14 need not be a multiple-V belt. For example, the pulley 24 could have a single groove and the belt 14 could be a single V belt, or the pulley 24 may have a generally flat portion for engaging a flat belt 14. The pulley 24 further includes an inner surface 43, which the wrap spring clutch 32 may engage in order to couple the pulley and hub 22 together. The pulley 24 may be made from any suitable material, such as a steel, or aluminum, or in some cases a polymeric material, such as certain types of nylon, phenolic or other materials. As can be seen in FIG. 3A, the pulley 24 has a proximal end 46 (i.e. an end that is closer to the accessory to which the pulley 24 is mounted), and a distal end 47 (i.e. an end that is farther from the accessory to which the pulley 24 is mounted).

The first bearing member 26 rotatably supports the pulley 24 on the hub 22 at the proximal axial end 46 of the pulley 24. The first bearing member 26 may be any suitable type of bearing member, such as a ball bearing. A first retainer 45 is provided, which mounts into a groove of the pulley 24 to hold the first bearing member 26 in place. The first retainer 45 may be, for example, a removable C-clip, as shown, or any other suitable kind of retainer.

The second bearing member 27 is positioned at the distal end 47 of the pulley 24 so as to rotatably support the pulley 24 on a pulley support surface 48 of the hub 22. The second bearing member 27 may mount to the pulley 24 and to the hub 22 in any suitable ways. In the embodiment shown, the second bearing member 27 may be molded around the pulley support surface 48 by an injection molding process wherein the hub 22 forms part of the mold. The hub 22 may have a coating thereon prior to insertion into the mold cavity, to prevent strong adherence of the bearing member 27 to the pulley support surface 48 during the molding process, so that after removal of the hub 22 and bearing member 27 from the molding machine (not shown), the bearing member 27 can rotate about the hub 22. It will be noted that other ways of joining the second bearing member 27 and the pulley 24 may be employed, such as adhesive bonding, and/or using mechanical joining elements (e.g. resilient locking tabs) that would lock the bearing member 27 to the pulley.

The isolation spring 28 is provided to accommodate oscillations in the speed of the belt 14 relative to the shaft 15. The isolation spring 28 may be a helical torsion spring that has a first helical end 50 that is held on a helical support surface 55 and that abuts a radially extending driver wall 52 (FIG. 4) on the carrier 30. The isolation spring 28 has a second helical end 53 (FIG. 3B) that engages a similar driver wall 57 (a small portion of which is visible in FIG. 3A) on the hub 22. In the embodiment shown, the isolation spring 28 has a plurality of coils 58 between the first and second ends 50 and 53. The coils 58 are preferably spaced apart by a selected amount and the isolation spring 28 is preferably under a selected amount of axial compression installed in the decoupler 20, which urges the isolation spring 28 to keep a position in which the first and second helical ends 50 and 53 are abutted with the respective driver walls 52 and 57 on the carrier 30 and hub 22. An example of a suitable engagement between the isolation spring 28, the hub 22 and the carrier 30 is shown and described in U.S. Pat. No. 7,712,592, the contents of which are incorporated herein by reference.

The isolation spring 28 is positioned to receive torque from the wrap spring clutch 32, and to transmit torque to the hub 22 at least indirectly.

A thrust plate 73 may be provided to receive the axial thrust force of the carrier 30 resulting from the axial compression of the isolation spring 28. A second retainer 75 may be provided between the thrust plate 73 and the first bearing member 26. A partial cover 100 is mountable to the pulley to inhibit dust and debris from migrating into the decoupler 20 during operation.

The isolation spring 28 may be made from any suitable material, such as a suitable spring steel. The isolation spring 28 may have any suitable cross-sectional shape. In the figures, the isolation spring 28 is shown as having a generally rounded rectangular cross-sectional shape, which provides it with a relatively high torsional resistance (i.e. spring rate) for a given occupied volume. However, a suitable spring rate may be obtained with other cross-sectional shapes, such as a circular cross-sectional shape or a square cross-sectional shape.

The isolation spring 28 changes size radially based on how much torque is being transferred through the isolation spring 28. In the embodiment shown, the isolation spring 28 expands radially as torque transfer therethrough increases. A sleeve 66 may optionally be provided to ensure separation of the isolation spring 28 and the wrap spring clutch 32 during radial expansion of the isolation spring 28.

The wrap spring clutch 32 is positioned to receive torque from the pulley 24. The wrap spring clutch 32 is generally helical, and has a first end 51 that is engageable with the first helical end 50 of the isolation spring 28 for torque transfer therewith. The first end 51 of the wrap spring clutch 32 may be fixedly connected to the carrier 30, by having one or more bends (e.g. shown at 51a), which tightly engage a carrier slot 102 in the carrier 30, which is complementary to the first end 51 of the wrap spring clutch 32. The bent shape of the first end 51 and its engagement with the slot 102 prevents withdrawal of the first end 51 from the slot 102. The wrap spring clutch 32 also has a second end 59 that may be free floating.

Figure 4:
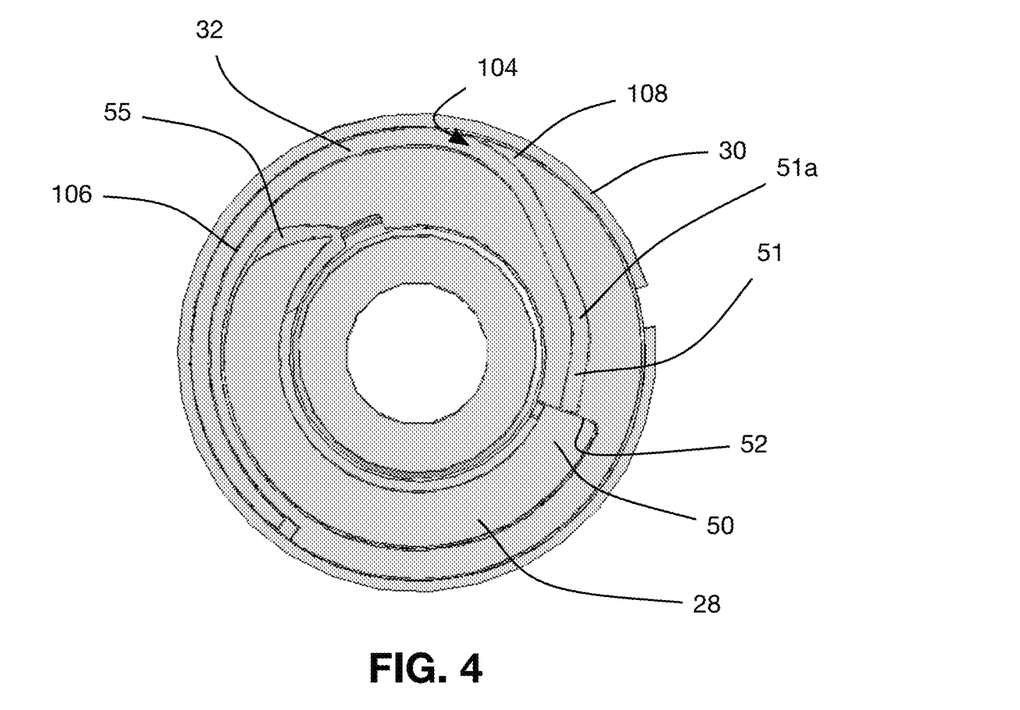
FIG. 4 is a sectional view of the decoupler shown in FIG. 2.
Figure 5A:
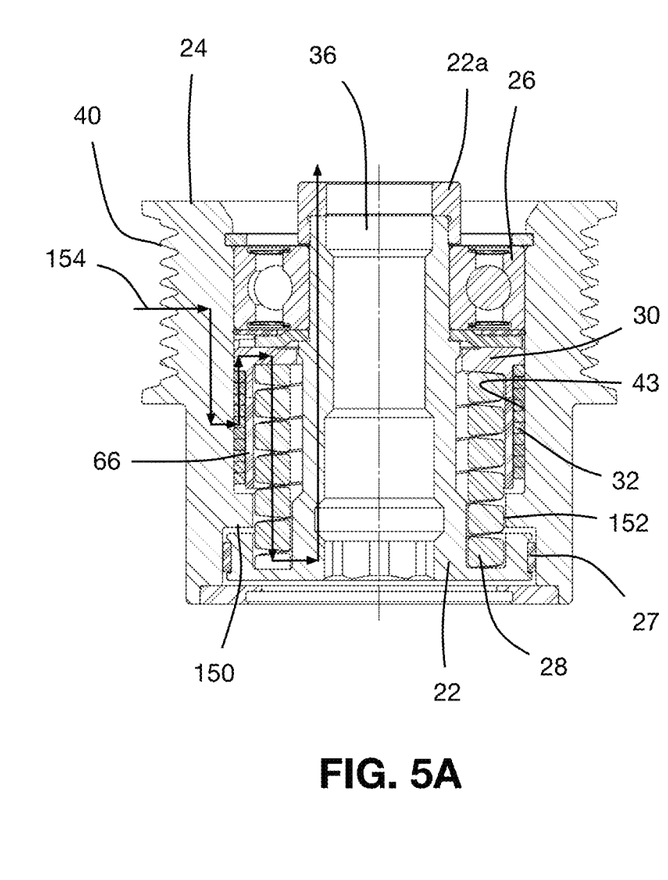
FIG. 5A is a sectional elevation view of the decoupler shown in FIG. 2 during a low torque transfer.
Figure 6:
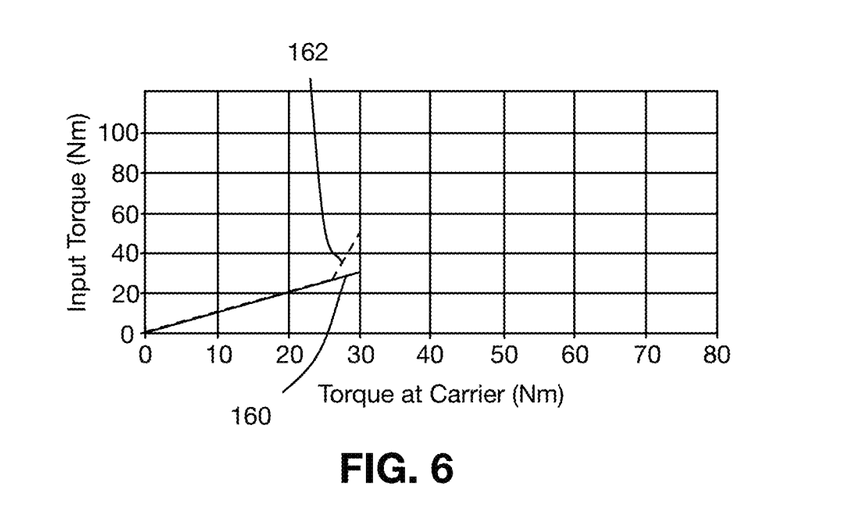
FIG. 6 is graph illustrating the relationship between torque inputted to a pulley of the decoupler and the torque transferred at a carrier in the decoupler, for both the decoupler shown in FIG. 2 and a prior art decoupler.

The carrier 30 itself may be made from any suitable material such as, for example, a suitable nylon or the like. The slot 102 has a slot exit 104 through which the wrap spring clutch 32 exits from the slot 102 to wrap around an exterior of the carrier 30 (shown at 106). The slot exit 104 is defined on a radially exterior side thereof by an end wall 108 of the carrier 30. As can be seen in FIGS. 4, 5A, and 6, the end wall 108 is only supported at its base, to the rest of the carrier 30.

When a torque is applied from the belt 14 to the pulley 24 to drive the pulley 24 at a speed that is faster than that of the shaft 15, friction between the inner surface 43 of the pulley 24 and the coils of the wrap spring clutch 32 drives at least one of the coils of the wrap spring clutch 32 at least some angle in a first rotational direction about the axis A, relative to the first end 51 of the wrap spring clutch 32. The relative movement between the one or more coils driven by the pulley 24 relative to the first end 51 causes the clutch spring to expand radially, which further strengthens the grip between the coils of the wrap spring clutch 32 and the inner surface 43 of the pulley 24. As a result, the first end 51 of the wrap spring clutch 32 transmits the torque from the pulley 24 to the hub 22 through the isolation spring 28. As a result, the hub 22 is brought up to the speed of the pulley 24. Thus, when the pulley 24 rotates faster than the hub 22, the wrap spring clutch 32 operatively connects the pulley 24 to the carrier 30 and therefore to the hub 22.

During torque transfer through the decoupler 20 between the pulley 24 and the hub 22, the first end 51 of the wrap spring clutch 32 is positioned to apply a clutch-related radial force on the end wall 108, and the isolation spring 28 is positioned to apply an isolation spring-related force on the carrier 30 that is at least partially opposed to the clutch-related radial force.

In general, the clutch-related radial force is a distributed force, a part of which is applied to the end wall 108. This can lead to a fatigue failure of the end wall 108 over time due to repeated application of this clutch-related radial force thereon. Other stresses that are incurred by the carrier 30 can also lead to failure of the carrier 30 in other ways. Deformation or failure of the carrier 30 can lead to failure of the decoupler 20, or at least can lead to a shortened operating life for the decoupler 20.

In order to reduce the likelihood of deformation or failure of the carrier 30, the pulley 24 includes a radial projection 150 (shown best in FIGS. 5A and 5B) that is positioned to frictionally engage the radially outer surface (shown at 152) of the isolation spring 28 when the isolation spring 28 reaches a selected radial size (i.e. when the isolation spring 28 transmits a selected amount of torque). The frictional engagement of the radial projection 150 with the isolation spring 28 generates torque transfer directly from the pulley 24 to the isolation spring 28, which is in parallel with the torque transfer that takes place from the pulley 24 to the isolation spring 28 through the wrap spring clutch 32.

FIG. 5A shows the torque transfer path (at 154) through the decoupler 20, when the torque being transferred is sufficiently small that the torque has not caused the isolation spring 28 to expand radially enough to engage the radial projection 150. As can be seen, the torque transfer path 154 passes from the pulley 24, to the wrap spring clutch 32, to the carrier 30, to the isolation spring 28, and from the hub 22 (and the hub extension 22a) into the shaft 15 of the accessory (not shown in FIGS. 5A and 5B). The hub extension 22a may itself, for simplicity, be considered to be part of the hub 22.

Figure 5B:
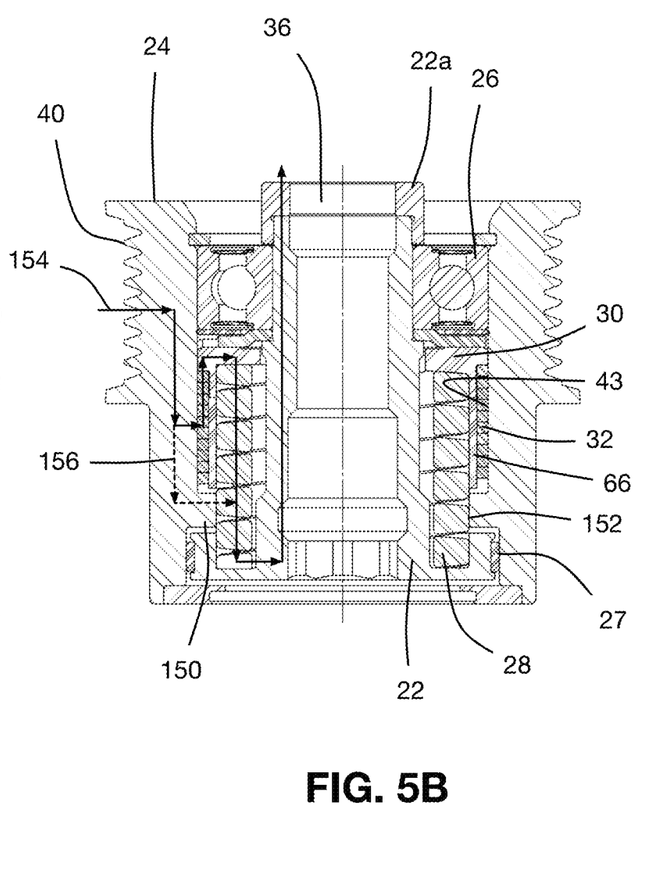
FIG. 5B is a sectional elevation view of the decoupler shown in FIG. 2 during a high torque transfer.

FIG. 5B shows the torque transfer path (at 156) through the decoupler 20, when the torque being transferred is sufficiently large that the torque has caused the isolation spring 28 to expand radially enough to engage the radial projection 150. As can be seen, the torque transfer path 154 continues to be present. However, some portion of the torque is transferred directly from the pulley 24 into the isolation spring 28 through the radial projection 150, via the torque path shown at 156 in FIG. 5B. As the torque that is inputted to the pulley 24 from the belt 14 further increases, the isolation spring 28 presses more and more firmly against the radial projection 150, which increases the frictional force therebetween, which in turn increases the amount of torque that is transferred directly to the isolation spring 28 from the pulley 24 through the radial projection 150.

FIG. 6 shows a graph with two curves 160 and 162 that show the relationship between the torque that is inputted to the pulley 24 via the belt 14 and the torque that is transferred through the carrier 30, for the decoupler 20 (curve 160) and for a decoupler of the prior art (curve 162). As can be seen, the curves 160 and 162 are superimposed for torques below a selected torque, which in the present example is about 26 Nm. For torques above 26 Nm, the prior art decoupler has a torque transfer that continues linearly in a one-to-one relationship, since all the torque being inputted to the pulley continues to pass through the carrier. For the decoupler 20, however, additional torque that is inputted to the pulley 24, is partly transferred through the carrier 30, and partly transferred directly through the radial projection into the isolation spring 28. As a result, in the example graph shown, the decoupler 20 is capable of transmitting, for example, 50 nm, while only about 30 Nm passes from the wrap spring clutch 32 to the isolation spring 28 through the carrier 30.

The pulley 24 and the hub 22 are merely examples of a suitable decoupler input member and a suitable decoupler output member, any suitable decoupler input member and decoupler output member may be provided. In some embodiments, for example, such as an embodiment in which the decoupler 20 is mounted to the crankshaft 12, the pulley 24 would constitute a decoupler output member and the hub 22 that mounts to the crankshaft 12 would constitute a decoupler input member.

The wrap spring clutch 32 is just one example of a one-way clutch that may be used in the decoupler 20. It is alternatively possible to use any other suitable type of one-way clutch such as a roller clutch or a sprag clutch, which may transfer torque to the isolation spring with or without the presence of a carrier like the carrier 30. While the carrier 30 in the present embodiment benefits from the presence of the radial projection, it is alternatively possible to provide a benefit to a decoupler that does not have a carrier 30, since reducing the torque transfer through the one-way clutch itself permits one to select a one-way clutch that has a lower maximum strength.

In the present example, the radial projection projects inwardly from the pulley 24 (i.e. from the decoupler input member), and engages a radially outer surface of the isolation spring 28. Additionally, the isolation spring 28 is configured to expand radially as torque transfer therethrough increases. However, it is alternatively possible to provide an embodiment in which the isolation spring contracts radially as torque transfer therethrough increases, and where the decoupler input member has a radial projection that extends radially outwards therefrom that is positioned to engage the isolation spring at a selected amount of torque transfer through the isolation spring.

The decoupler input member includes a radial projection that is positioned to frictionally engage one of the radially outer and radially inner surfaces of the isolation spring when the isolation spring reaches a selected radial size, wherein, frictional engagement of the radial projection with the isolation spring generates torque transfer directly from the decoupler input member to the isolation spring in parallel with torque transfer from the decoupler input member to the isolation spring through the one-way clutch.

Accordingly, it may be said broadly that, the decoupler input member includes a radial projection that is positioned to frictionally engage one of the radially outer and radially inner surfaces of the isolation spring when the isolation spring reaches a selected radial size, wherein, frictional engagement of the radial projection with the isolation spring generates torque transfer directly from the decoupler input member to the isolation spring in parallel with torque transfer from the decoupler input member to the isolation spring through the one-way clutch.

A decoupler is shown in the figures and described herein. The decoupler may be for an accessory drive for an engine, and in particular for a vehicular engine as shown, or for any other suitable type of engine.

While the description contained herein constitutes a plurality of embodiments of the present invention, it will be appreciated that the present invention is susceptible to further modification and change without departing from the fair meaning of the accompanying claims.

What is claimed is:

1. A decoupler, comprising:
   a decoupler input member;
   a decoupler output member, wherein the decoupler input member is rotatable relative to the decoupler output member, and wherein the decoupler input member and the decoupler output member are rotatable about an axis;
   a one-way clutch and an isolation spring that are positioned to transfer torque in series with one another,
   wherein the isolation spring is a helical torsion spring, having a first helical end and a second helical end, and having a first axial end and a second axial end, and having a radially outer surface and a radially inner surface, wherein the isolation spring is positioned to receive torque through the first helical end and to transmit torque to the decoupler output member at least indirectly, through the second helical end, wherein the isolation spring changes size radially based on how much torque is being transferred through the isolation spring,
   wherein one of the decoupler input member and the decoupler output member includes a radial projection that is positioned to frictionally engage one of the radially outer and radially inner surfaces of the isolation spring when the isolation spring reaches a selected radial size, wherein, frictional engagement of the radial projection with the isolation spring generates torque transfer directly between said one of the decoupler input member and the decoupler output member and the isolation spring in parallel with torque transfer between said one of the decoupler input member and the decoupler output member and the isolation spring through the one-way clutch,
   wherein the decoupler input member is a pulley and the decoupler output member is a hub that is shaped to mount to a shaft of an accessory.

2. The decoupler as claimed in claim 1, wherein the one-way clutch is a wrap spring clutch having a radially outer surface and a radially inner surface, wherein one of the radially outer surface and the radially inner surface is frictionally engaged with the decoupler input member during torque transfer from the decoupler input member to the wrap spring clutch, wherein the wrap spring clutch has a first helical end, and
   wherein the decoupler further comprises a carrier that is positioned to hold the first helical end of the isolation spring and the first helical end of the wrap spring clutch for torque transfer therebetween.

3. The decoupler as claimed in claim 2, wherein the wrap spring clutch and the isolation spring are metallic and the carrier is polymeric.

4. A decoupler, comprising:
   a decoupler input member;
   a decoupler output member, wherein the decoupler input member is rotatable relative to the decoupler output member, and wherein the decoupler input member and the decoupler output member are rotatable about an axis;
   a one-way clutch and an isolation spring that are positioned to transfer torque in series with one another,
   wherein the isolation spring is a helical torsion spring, having a first helical end and a second helical end, and having a first axial end and a second axial end, and having a radially outer surface and a radially inner surface, wherein the isolation spring is positioned to receive torque through the first helical end and to transmit torque to the decoupler output member at least indirectly, through the second helical end, wherein the isolation spring changes size radially based on how much torque is being transferred through the isolation spring,
   wherein one of the decoupler input member and the decoupler output member includes a radial projection that is positioned to frictionally engage one of the radially outer and radially inner surfaces of the isolation spring when the isolation spring reaches a selected radial size, wherein, frictional engagement of the radial projection with the isolation spring generates torque transfer directly between said one of the decoupler input member and the decoupler output member and the isolation spring in parallel with torque transfer between said one of the decoupler input member and the decoupler output member and the isolation spring through the one-way clutch,
   wherein the one-way clutch is a wrap spring clutch having a radially outer surface and a radially inner surface, wherein one of the radially outer surface of the wrap spring clutch and the radially inner surface of the wrap spring clutch is frictionally engaged with said one of the decoupler input member and the decoupler output member during torque transfer between the wrap spring clutch and said one of the decoupler input member and the decoupler output member, and
   wherein the decoupler further comprises a carrier that is positioned to hold the wrap spring clutch and to hold the first helical end of the isolation spring for torque transfer therebetween, wherein the carrier includes an axial extension that is positioned between the isolation spring and the wrap spring clutch, and is positioned to constrain a concentricity of the isolation spring about the axis through direct contact with the isolation spring.

5. The decoupler as claimed in claim 4, wherein the wrap spring clutch and the isolation spring are metallic and the carrier is polymeric.

6. The decoupler as claimed in claim 4, wherein the decoupler input member is a pulley and the decoupler output member is a hub that is shaped to mount to a shaft of an accessory.

* * * * *